(12) United States Patent
Leister (10) Patent No.: US 8,547,615 B2
(45) Date of Patent: Oct. 1, 2013

(54) HEAD-MOUNTED DISPLAY DEVICE FOR GENERATING RECONSTRUCTIONS OF THREE-DIMENSIONAL REPRESENTATIONS

(75) Inventor: Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 919 days.

(21) Appl. No.: 12/518,145

(22) PCT Filed: Dec. 4, 2007

(86) PCT No.: PCT/EP2007/063225
§ 371 (c)(1),
(2), (4) Date: Nov. 24, 2009

(87) PCT Pub. No.: WO2008/071588
PCT Pub. Date: Jun. 19, 2008

(65) Prior Publication Data
US 2010/0097671 A1    Apr. 22, 2010

(30) Foreign Application Priority Data

Dec. 12, 2006   (DE) .......................... 10 2006 059 400

(51) Int. Cl.
*G03H 1/08*   (2006.01)
(52) U.S. Cl.
CPC ..................................... *G03H 1/08* (2013.01)
USPC .............................................. 359/9; 359/13
(58) Field of Classification Search
None
See application file for complete search history.

(56) References Cited

U.S. PATENT DOCUMENTS

| 4,933,755 A | 6/1990 | Dahl et al. |
| 2004/0108971 A1 | 6/2004 | Waldern et al. |

FOREIGN PATENT DOCUMENTS
WO   WO 01/75531   10/2001

OTHER PUBLICATIONS

Practical Holographiy XI and Holographic Materials III, vol. 3011, pp. 14-18 (Feb. 10, 1997) XP002474827, Proceedings of the SPIE—The International Society for Optical Engineering.
International Search Report, dated Apr. 17, 2008, issued in priority International Application No. PCT/EP2007/063225.

*Primary Examiner* — Derek S Chapel
(74) *Attorney, Agent, or Firm* — Saul Ewing LLP (57) ABSTRACT

A head-mounted display device for generating reconstructions of three-dimensional representations including a frame, in which at least one light source, at least one optical system and at least one encodable light modulator are situated, wherein the light modulator with an encoding of a wavefront of the three-dimensional representation in the encoding area is positioned at the place of an observer window defined in an observer plane or the light modulator with an encoding of a hologram of the wavefront of the three-dimensional representation in the encoding area is positioned in the region closely in front of the observer window for transforming the hologram into the observer window. When the light modulators are illuminated, complex wavefronts of the three-dimensional representation are situated in the observer window and the reconstruction of the three-dimensional representation is visible in a visual cone spanned by the observer window and the light modulator.

20 Claims, 8 Drawing Sheets

HEAD-MOUNTED DISPLAY DEVICE FOR GENERATING RECONSTRUCTIONS OF THREE-DIMENSIONAL REPRESENTATIONS

CROSS REFERENCE TO RELATED APPLICATIONS

This application claims the priority of PCT/EP2007/063225, filed on Dec. 4, 2007, which claims priority to German Application No. 10 2006 059 400.2, filed Dec. 12, 2006, the entire contents of which are hereby incorporated in total by reference.

FIELD OF THE INVENTION

The present invention relates to a head-mounted display device for generating reconstructions of three-dimensional representations—objects and scenes—, comprising a headgear which resembles a helmet or goggles with at least a front section and two side sections disposed at a distance, where the front section is related to the positions of the eyes.

BACKGROUND OF THE INVENTION

Document GB 1 505 873 describes a helmet-mounted optical display device for the presentation of a visual display to a helmet-wearing observer, where a reflective visor is mounted to the front of the helmet at such a distance that it lies in the observer's field of view, and where a conventionally generated hologram is formed on or carried by the visor. A reconstructing light source can be disposed in each side section of the helmet at such a distance to the reflective hologram that if the hologram is illuminated, the image thereon can only be reconstructed as a small representation in the observer's field of view.

One problem with this arrangement is that the visual reconstructions are limited to small representations; the helmet-mounted optical display device cannot be used for encoding and visualisation of large objects, let alone movie scenes.

Document U.S. Pat. No. 5,257,094 describes a helmet-mounted display device which comprises optical elements, e.g. mirrors and beam splitters, and holographic elements in its front section, which aim to improve permeability as regards both externally provided quantities and superimposed display information from two miniature cathode ray tubes disposed at the side sections. The display device further comprises a combined focussing lens. The optical link between the information-providing screen of the miniature cathode ray tubes and the corresponding observer pupils is designed such that the weight of the headgear including the display device is reduced.

One problem is that the observer must carry a rather heavy load on his head, because of the heavy overall weight of the headgear, despite the efforts which have been made in order to reduce the weight of the display device components mounted on the headgear. The display device is limited to the given arrangement of prefabricated optical and holographic components.

Document U.S. Pat. No. 4,933,755 describes a head-mounted stereoscopic display device, where a left and a right stereo image are represented on liquid-crystal displays for the right and left eye, respectively. This makes it possible to watch stereoscopic video images without the problem of an optical separation of those images for the respective eye, which typically occurs in direct-view displays.

Further, document U.S. Pat. No. 6,674,493 describes a head-mounted display device, where a common liquid crystal display is provided for both eyes, and where the stereo image is presented sequentially to both eyes through an active beam splitter.

One problem of stereoscopic head-mounted display devices is that although they are able to generate a stereo image, this stereo image exhibits all the drawbacks of stereoscopic image generation, in particular the missing possibility of an accommodation of the eye to an object with true depth, as are provided in holographic display devices, where three-dimensional objects are reconstructed based on computer-generated video holograms.

Further, document DE 10 2004 063 838 A1 describes a method and a device for computing computer-generated video holograms, where the reconstructions of the holograms encoded on a light modulator can be viewed from observer windows, and where there is a certain complex amplitude and phase distribution in those observer windows which is identical to the light which would be imaged by a real three-dimensional scene to the same position. The observer views the reconstruction of the three-dimensional scene through the observer window, where there are generally two separate observer windows, one for the left eye and one for the right eye.

The computation of the wave fronts in the observer windows is carried out by virtually slicing a three-dimensional scene within a frustum, i.e. a frustum-shaped space, into section planes, by computing the light propagation from those planes into an observer plane by way of transformations, and by summing them up there in an observer window. The size of the observer window can be confined to about the size of an eye or eye pupil.

During the reconstruction, the wave fronts which are necessary to make a certain three-dimensional representation - objects and/or scenes - visible in the observer windows can be generated in two different ways:

first, directly by encoding the complex wave front of the three-dimensional representation on a light modulator, which is situated outside the observer plane, and which is imaged into the respective observer window; or secondly, indirectly by encoding the transformation of the complex wave front of the three-dimensional representation as a hologram on a light modulator, which is again situated outside the observer plane, and by back-transforming the complex wave front into the respective observer window.

In either case, the information encoded on the light modulator is imaged or back-transformed into the observer window through an optical system, which is referred to as a screen. Usually, it is desired to realise a screen area which is as large as possible, e.g. 20 inches or more, and observer distances as with desktop displays or TV sets. Either a transform of the complex wave front encoded on the light modulator, as in the former case, or an enlarged image of the hologram encoded on the light modulator, as in the latter case, are generated on that area.

In either case, the frustum is defined by the viewing angle of the observer looking on to the screen surface. The observer shall be situated at such a distance to the screen surface as if he was using a desktop display or TV set. In both types of holographic direct-view displays, an observer can move relative to the screen surface, and he can watch a reconstruction of the three-dimensional representation from various positions.

Known holographic direct-view displays exhibit for example the following problems: they require the position of the observer window to be changed in space as the observer moves, i.e. it becomes necessary to track the observer window, and to provide all the devices necessary for this, such as components for detecting the eye position and optical components for tracking the observer window. Further, a large screen area is required. This makes the manufacture of holographic display devices relatively complicated and expensive.

SUMMARY OF THE INVENTION

It is therefore the object of the present invention to provide a head-mounted display device for generating reconstructions of three-dimensional representations, said head-mounted display device being designed such that its manufacture can be made easier and less expensive.

The object is solved with the help of the features of claim 1.

The head-mounted display device for generating reconstructions of three-dimensional representations comprises according to claim 1 a frame which resembles a helmet or goggles with at least a front section and two side sections disposed at a distance, where the front section is related to the positions of the eyes, and has a design where there are at least one light source, at least one optical
system and at least one light modulator which can be encoded, where the light modulator with a code of a wave front of the three-dimensional representation in the encoding surface is located at the position of a defined observer window in an observer plane or where the light modulator with a code of a hologram of a wave front of the three-dimensional representation in the encoding surface is located in a region close in front of the observer window for a transformation of the hologram into the observer window such that its size corresponds at least with a part of the range of movement of an eye pupil of the respective eye, and where the light modulator is connected to an encoding device in which wave fronts or holograms thereof are computed from the three-dimensional representations for the encoding surfaces, with which the light modulator can be encoded directly, so that if the light modulators are illuminated there are complex wave fronts of the three-dimensional representations in the observer window and the reconstruction of the three-dimensional representation becomes visible in a reconstruction frustum, which stretches between the observer window and the light modulator, and
where, depending on the size of the observer window, at least one element for suppressing cross-talking of deflected light among the two eyes can be used in the vicinity of the observer plane.

Here, 'representation' is a collective term which shall include spatial objects and spatial scenes both in their stationary position and in a moving state in the form of real situations, films or video recordings.

The encoding surfaces of the light modulators which are disposed in the observer windows in the observer plane can be encoded with complex values of wave fronts comprising amplitude and phase, or with values derived from those complex values, provided by the encoding device, where one light modulator is disposed directly in or in front of the observer window of the left eye, and a second light modulator is disposed directly in or in front of the observer window of the right eye.

For encoding the complex values of the wave fronts in the observer windows, a combination of amplitude- and/or phase-modulating light modulators can be provided, which are connected by a beam splitter or by an imaging of one light modulator on to the other light modulator.

The amplitude-modulating light modulators can for example be disposed outside the observer plane in a region near the observer windows, and the phase-modulating light modulators, overlapped by the modulator image of the amplitude-modulating light modulator, can be disposed directly in the observer plane, where the encoding surfaces of the amplitude-modulating light modulators are imaged on to the corresponding phase-modulating light modulator as a modulator image with the help of an optical imaging system.

On the other hand, the amplitude-modulating light modulator and the phase-modulating light modulator can be disposed the other way round.

The encoding surface of a light modulator can be defined such that its size corresponds with the entire range of movement of the eye pupil within the eye, so that a reconstruction of the three-dimensional representations is visible without any discontinuities when the eye pupil moves.

The encoding surfaces of the light modulators can preferably have the same size as the surface areas of the eye pupils.

The light modulators can optionally have a continuous or pixelated encoding surface, where the pixels are areal elements whose amplitude and/or phase can be encoded.

If only one light modulator is used in the optical part, the light modulator is disposed across the direction of the centre axis, and a light source and an optical system are disposed in front of that light modulator, where a subsequently disposed beam splitter and two reflectors, which are disposed at the sides of it and at a distance to each other and which are inclined in relation to the axes of the eye pupils, are disposed in front of the observer plane, and where the encoding surface of the light modulator is transformed into the two observer windows with the help of the optical system and the beam splitter, where a switching device is disposed in the optical path, said switching device switching the complex information which alternates on the encoding surface of the light modulator alternately to the left and right observer windows at a given frequency.

The switching device can be designed in the form of a deflection device for bundles of rays, which is frequency-controlled by the encoding device.

The switching device can be disposed either in the unsplit or in the split optical path.

In the optical path with at least one light source, at least one light modulator, an optical system in the form of an illuminating optical system, and with the generated wave fronts in the observer windows, there can be at least one element or component which serves as an aperture stop, which blocks occurring disturbing diffracted light between the two eyes so as to prevent cross-talking.

An angle-sensitive element in the form of a passive or active optical element can be disposed between a light modulator and an eye, said element only letting light pass which is emitted by the light modulator into a small angle.

If two light modulators are used in the optical part of the second display device according to this invention, a filter unit or an aperture stop can be disposed between the one light modulator and the one observer window on the one hand and the other light modulator and the other observer window on the other hand, where a compact design is provided with lenses which exhibit a short focal length.

The encoding device can at least comprise a computer and memory and programming means for carrying out the computations of the information for encoding the individual pixels of the encoding surface(s) of the light modulator(s).

The light modulator(s) for one or both eyes are connected with at least one light source, which directs sufficiently coherent light at the light modulators.

If colour reconstructions are desired, the light sources can comprise three sub-light sources which emit a green, red and blue spectrum, respectively, which are optionally combined by way of time multiplexing.

The frame can comprise at least one supporting element.

Both transparent and reflective optical parts can be disposed in the front section, where the optical parts are mounted firmly to the frame with few components, in particular mechanical means and the supporting elements.

The frame can optionally be a helmet, goggles, or a supporting arrangement fitted with a minimum number of parts at least for the optical part, where the display device optionally has the form of goggles (face-mounted display) or is supported by a helmet (helmet-mounted display) in a firmly standing form, or is firmly connected in a mobile form with the helmet and/or head of the observer (head-mounted display).

An adjustment device can be disposed between a light modulator and at least one supporting element of the frame, and a locking device can be disposed between a light modulator and the corresponding light source, where the light modulator and the corresponding optical part with light source and optical system are adjustable and lockable with the help of the adjustment device and the locking device in relation to the observer plane and/or the centre axis of the display device and the axes of the eye pupils which are parallel to the latter.

Between the adjustment devices and locking devices and the optical part and supporting elements, there are mainly mechanical connections for adjusting their positions, and the light sources and light modulators are connected with the encoding device and with the power supply through electric connection cables.

If the observer wears the display device according to this invention in the form of a head-mounted display firmly on his head, complicated devices such as devices for detecting the actual head and eye position and for tracking the observer window in the observer plane become superfluous, because the head-mounted display device moves automatically when the observer moves, and its position relative to the eye always remains the same.

However, it is also possible to react to observer movements in that for example at least one sensor, which is mounted to the frame, detects movements of the head, and whose signals are transmitted to the encoding device, and thereupon modified contents are encoded on the light modulator. In the region of the frame, there can thus be at least one sensor, which sends signals to the encoding device according to the change in the viewing angle of the observer when he moves his head, so that the information for encoding the light modulators is modified.

The frame can optionally be combined with at least one audio signal device, and the output of audio signals is switched in synchronism with the encoding of the wave fronts in the respective light modulators.

In the second display device according to this invention, the computation of the holograms encoded on the light modulators is carried out in analogy with the descriptions in the prior art documents or in previous patent applications—with frustum, section planes, transformation into the observer window and into the plane of the modulator—but which is, in contrast to those descriptions, designed to suit a helmet-mounted display or display device situated close to the eyes, i.e. for a very small distance between the light modulator and the observer eye.

In the display device, the advantages of the above-mentioned hologram computation, i.e. a confinement of the observer window to one eye, resulting in little requirements as regards resolution of the light modulator compared with the known holographic display devices, are combined with the advantages of a relatively simple optical arrangement involving few, small components.

When using the computing and encoding methods for the wave fronts and holograms, there are two main types of head-mounted display devices according to this invention: in the first type of head-mounted display device, a light modulator is disposed directly in the observer plane, or the light modulator is imaged across a short distance, typically few centimetres, into the observer plane. The complex values of the wave front in the observer window are written directly on to the encoding surface of the light modulator by the encoding device. An additional transformation into the observer plane is not necessary in this case.

In contrast, in the second type of head-mounted display device, the complex values of the wave front, which are encoded as a hologram, are transformed from the plane of the light modulator into the observer plane, where the light modulator is disposed at a small distance—preferably few centimetres—to the observer plane.

Further, combinations with other known methods can be employed for the computation of the holograms, e.g. with such methods where sub-holograms are directly computed for each point of the representation in a common plane, e.g. also using look-up tables, and where all sub-holograms are then summed up so as to create an aggregated hologram.

The computation of the sub-holograms can be carried out for the encoding surface of the light modulator. However, it can also be carried out in a different plane, and the sum of all sub-holograms can then be transformed on to the encoding surface of the respective light modulator. This can be preferable if the individual sub-holograms typically occupy a large area on the encoding surface of the light modulator, which would make a computation complicated, but if the individual sub-holograms are smaller in a different plane, performing the computation in that different plane makes the computation easier.

BRIEF DESCRIPTION OF THE DRAWINGS

The present invention is described in more detail below with the help of a number of embodiments and drawings, wherein.

DETAILED DESCRIPTION

Figure 1:
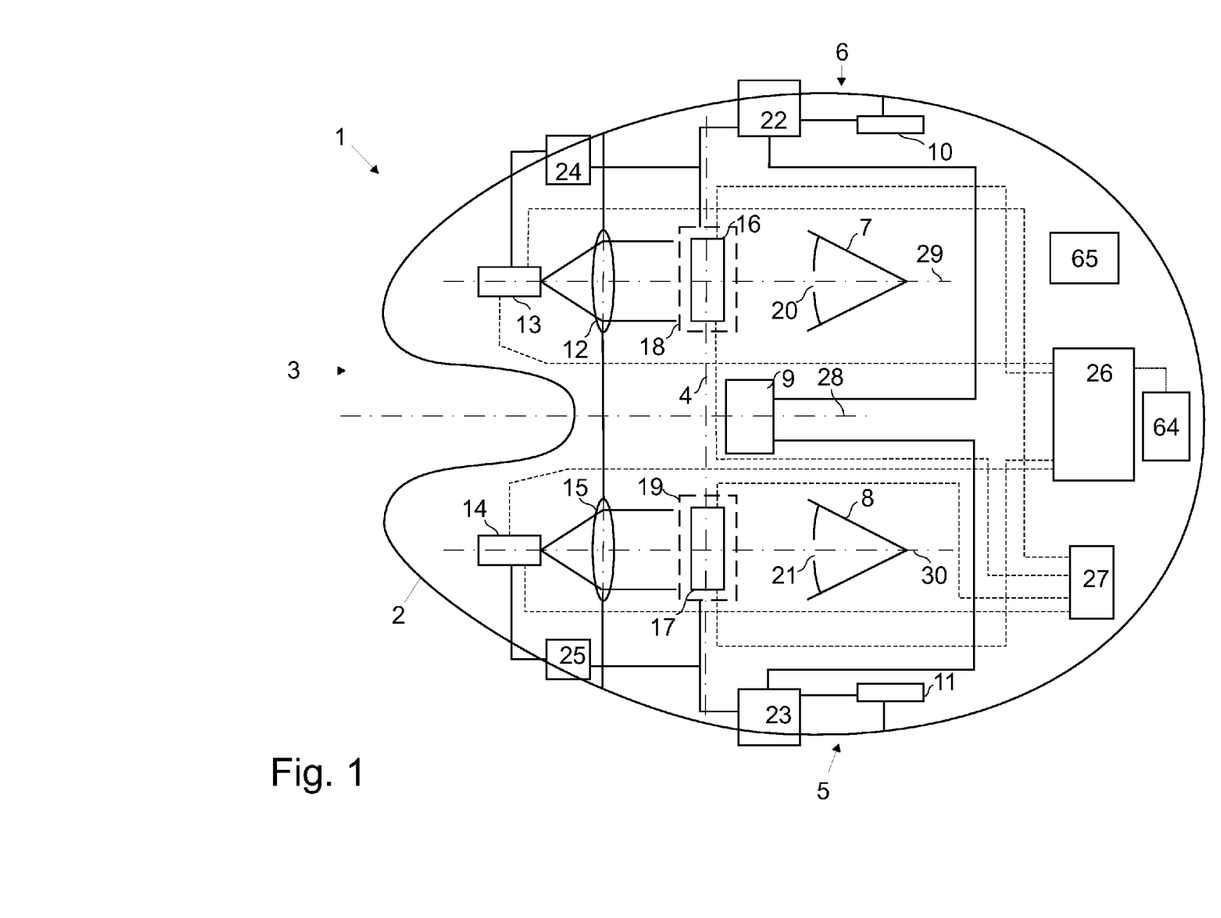
FIG. 1 is a top view showing schematically a first head-mounted display device according to this invention with two light modulators which are disposed in the observer windows in the observer plane and immediately in front of the eye pupils.

FIG. 1 shows schematically a first head-mounted display device 1 according to this invention for generating reconstructions of three-dimensional representations, said device comprising a frame 2 which resembles a helmet or goggles with at least a front section 3 and two side sections 5, 6 disposed at a distance, where the front section 3 is related to the positions of the eyes 7, 8, and where the frame 2 comprises multiple supporting elements 9, 10, 11.

Figure 2:
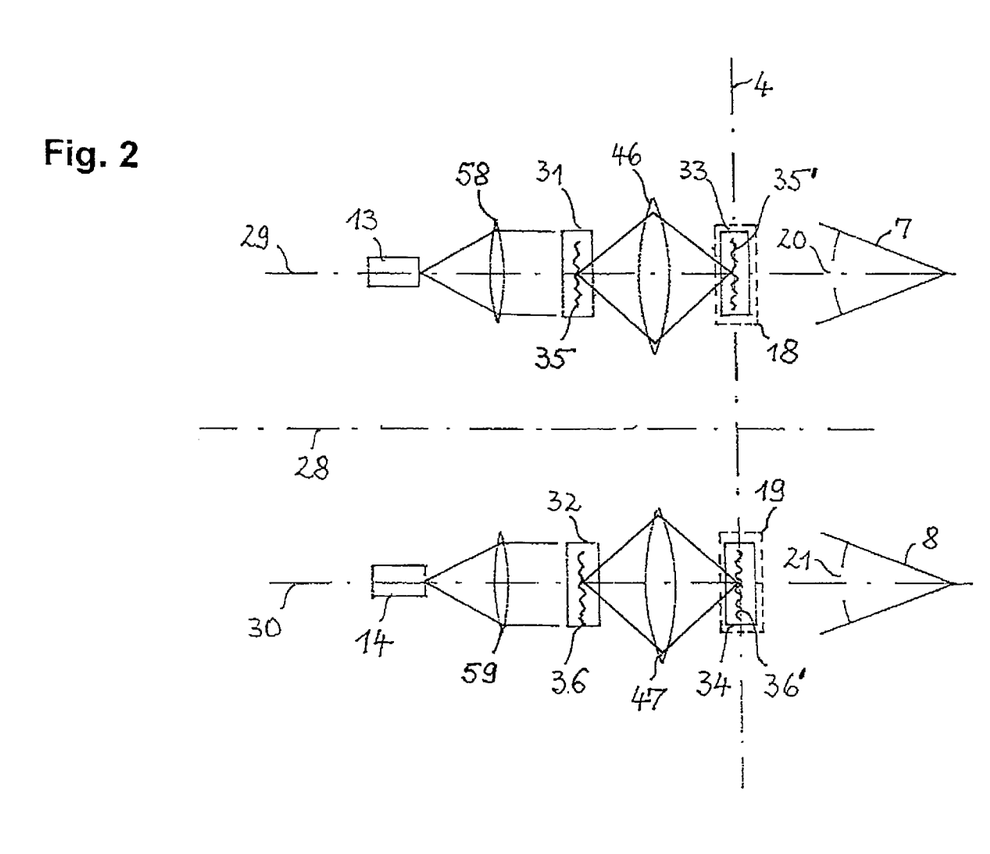
FIG. 2 shows schematically an optical part of the display device according to FIG. 1 with phase-modulating light modulators disposed in front of the eye pupils in each of the observer windows in the observer plane, where amplitude-modulating light modulators which are disposed in the regions in front of the observer windows are imaged on to the corresponding phase-modulating light modulators.

According to this invention, at least the front section 3 has a design where there are two light sources 13, 14, two corresponding optical systems 12, 15 and two light modulators 16, 17 which can be encoded with complex-valued information, where the light modulators 16, 17 are located at the positions of defined observer windows 18, 19, as shown in FIG. 1, or in a region close in front of the observer windows 18, 19 for an imaging into the observer windows 18, 19, as shown in FIG. 2, where an observer window 18, 19 is defined such that its size corresponds at least to a part of the range of movement of an eye pupil 20, 21 of the respective eye 7, 8, and where the light modulators 16, 17 are connected to an encoding device 26 in which wave fronts are computed from the three-dimensional representations, where the light modulators 16, 17 can be encoded with those wave fronts, so that there are complex wave fronts for visualisation in the observer windows 18, 19.

An adjustment device 22, 23 can be disposed each between the light modulators 16, 17 and the supporting elements 9, 10, 11 of the frame 2, and a locking device 24, 25 can be disposed each between the light modulators 16, 17 and the light sources 13, 14.

The light modulators 16, 17 and the light sources 13, 14 and the optical systems 12, 15 can be adjusted and locked in relation to the observer plane 4 and/or the centre axis 28 of the display device and to the axes 29, 30 of the eye pupils, which are parallel to the latter, with the help of the adjustment devices 22, 23 and the locking devices 24, 25.

While there are mainly mechanical connections (solid lines) between the adjustment devices 22, 23 and the locking devices 24, 25 on the one hand and the optical systems 12, 15 and the supporting elements 9, 10, 11 on the other hand, the light sources 13, 14 and the light modulators 16, 17 are connected with the encoding device 26 and a power supply 27 through electric connection cables (broken lines).

The encoding device 26 comprises at least a computer and memory and programming means for carrying out the computations of the information for encoding the individual pixels of the encoding surfaces of the corresponding light modulators 16, 17.

Between the adjustment devices 22, 23 and locking devices 24, 25 and the optical part 12, 15 and supporting elements 9, 10, 11, there are mainly mechanical connections for adjusting their positions, and the light sources 13, 14 and light modulators 16, 17 are connected with the encoding device 26 and with the power supply 27 through electric connection cables.

However, it is also possible to react to observer movements because, for example, at least one sensor 64, which is mounted to the frame 2, detects movements of the head, and its signals are transmitted to the encoding device 26, and thereupon modified contents are encoded on the light modulator 16, 17. In the region of the frame 2, there can thus be at least one sensor 64, which sends signals to the encoding device 26 according to the change in the viewing angle of the observer when he moves his head, so that the information for encoding the light modulators 16, 17 is modified.

The frame 2 can optionally be combined with at least one audio signal device 65, and the output of audio signals is switched in synchronism with the encoding of the wave fronts in the respective light modulators 16, 17.

In the first display device 1 according to this invention as illustrated in FIG. 1, the light modulators 16, 17 are disposed in the observer windows 18, 19 in the observer plane 4. Complex values of the wave front from the encoding device 26 can thus be written into the encoding surfaces of the two light modulators 16, 17, where a first light modulator 16 is disposed directly in the first observer window 18 for the left eye 7 and a second light modulator 17 is disposed directly in the second observer window 19 for the right eye 8.

For encoding the complex values of the wave front, a combination of amplitude- and/or phase-modulating light modulators can be provided, which are connected e. g. by a beam splitter or by an imaging of one light modulator on to the other light modulator.

However, this depends on the desired use of the existing programming means in the encoding device 26 and on the design of the optical part of the display device 1.

For example, as shown in FIG. 2, the amplitude-modulating light modulators 31, 32 can be imaged on to phase-modulating light modulators 33, 34 with the help of optical systems 46, 47, where the phase-modulating light modulators 33, 34 are disposed directly in the observer plane 4, and the modulator images 35', 36' of the amplitude-modulating light modulators 31, 32 are also disposed in the observer plane 4. The encoding surfaces 35, 36 of the amplitude-modulating light modulators 31, 32 are disposed in the region near the observer windows 18, 19, but outside the observer plane 4. The encoding surfaces 35, 36 of the amplitude-modulating light modulators 31, 32 are illuminated by the light sources 13, 14 through corresponding optical illumination systems 58, 59.

If there is no possibility to use a light modulator or a combination of light modulators which allow complex values to be written completely, the complex values of the wave front can also be represented in an approximated way, e.g. by a mere phase distribution which can be written to a phase modulator. This will result in deviations, in particular in conjunction with holographic encoding, between the actual values and the desired values of the wave fronts in the observer windows 18, 19, which cause the reconstruction to exhibit errors. A combination with methods for optimising such encoding processes, i.e. methods which are common practice in conjunction with phase holograms, such as iterative methods, is possible to achieve a correction.

The light modulator(s) 16, 17; 31, 32; 33, 34 for each eye 7, 8 are illuminated with sufficiently coherent light. A laser beam which is widened by the optical illumination system 58, 59 to the size of the light modulator 16, 17; 31, 32; 33, 34 may serve as an example for this. It is further possible to realise a colour reconstruction with the help of the methods commonly used for this, for example time multiplexing of red, green and blue light sources. The optical parts for each eye 7, 8 can mainly comprise only the light source(s) 13, 14, an optical imaging system 12, 15, and a light modulator 16, 17, where each light source 13, 14 can comprise three sub-light sources, e.g. LEDs, in order to be able to realise colour reconstructions.

Further, both transparent and reflective display devices according to this invention can be formed. Such an arrangement with few components can be firmly mounted to a frame (helmet or goggles) with the help of mechanical means—the supporting means 9, 10, 11—to the head of the observer or to a firmly mounted frame. The size of the light modulator 16, 17 and thus the size of the observer window 18, 19 is therein preferably chosen such that it covers the entire range of movement of the eye pupil 20, 21 within the eye 7, 8, so that the reconstruction can be viewed without any discontinuities if the eye pupil 20, 21 moves.

Figure 3:
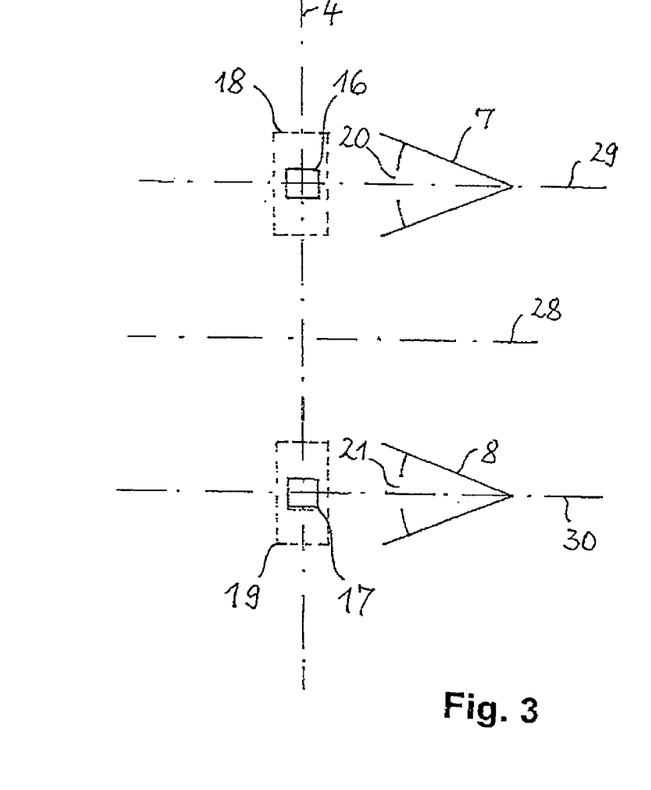
FIG. 3 shows schematically a light modulator arrangement according to FIG. 1 with two light modulators which are disposed in the observer windows in the observer plane and immediately in front of the eye pupils, and which have the same size as the eye pupils.

According to another embodiment of the first display device according to this invention, as shown schematically in FIG. 3, the light modulators 16, 17 can have encoding surfaces which are as large as the areas of the eye pupils 20, 21, where there are also certain movements of the eye pupils 20, 21 where the observer looks past the respective light modulator 16, 17 and does not see any reconstruction of three-dimensional representations.

Figure 5:
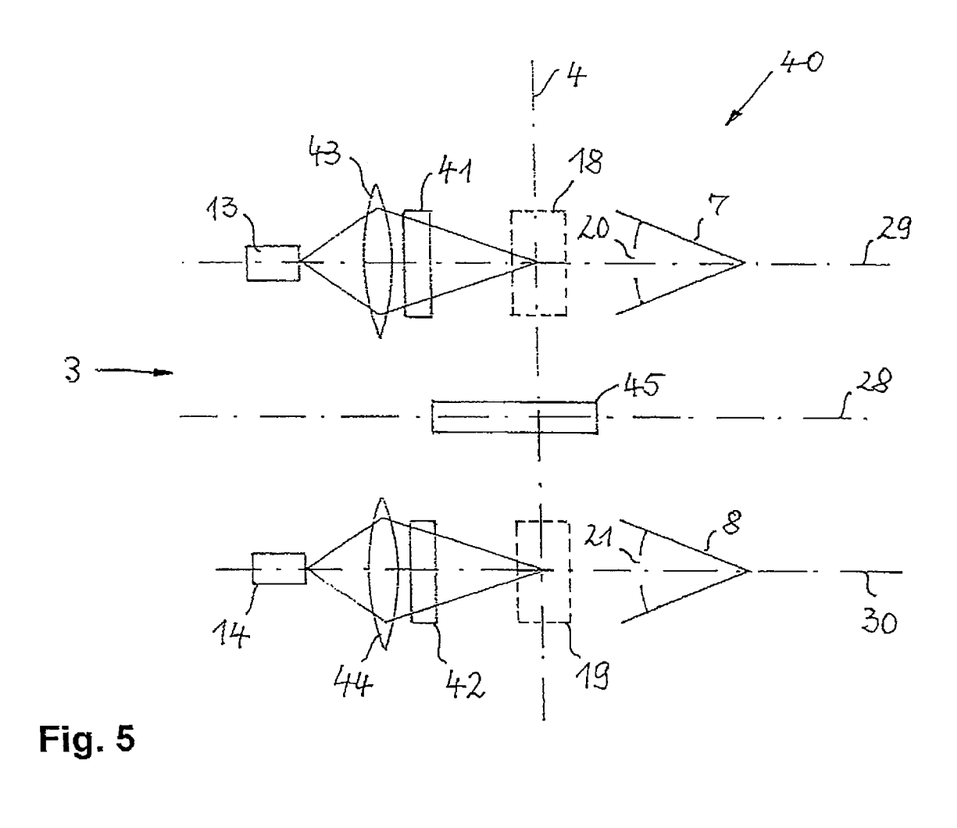
FIG. 5 shows schematically a second head-mounted display device according to this invention, which is reduced to the optical part, with two light modulators which are disposed in the region close in front of the observer windows but outside the observer plane, where an aperture stop for preventing cross-talking of deflected light is disposed in parallel orientation between the two parallel optical paths in the region between light modulators and eye pupils.

FIG. 5 shows a second display device 40 according to this invention for generating reconstructions of three-dimensional objects and scenes, said display device being reduced to the optical part, and comprising a frame which resembles a helmet or goggles with at least a front section and two side sections disposed at a distance, where the front section is related to the positions of the eyes, similar to the first display device 1 according to this invention.

The corresponding front section 3 has a design where there are two light sources 13, 14, two optical systems 43, 44 and two light modulators 41, 42 which can be encoded with complex-valued information, where the light modulators 41, 42 are located outside the observer plane 4 and close in front of the observer windows 18, 19, which are defined such that their size corresponds at least to a part of the range of movement of an eye pupil 20, 21 of the respective eye 7, 8, and where the light modulators 41, 42 are connected to an encoding device 26 in which wave fronts are computed from the three-dimensional representations, where the light modulators 41, 42 can be encoded with holograms of those wave fronts, and where the holograms are transformed into the corresponding observer windows 18, 19 by the optical systems 43, 44, so that there are complex wave fronts for visualisation in the observer windows 18, 19.

The mechanical frame 2 with the optional supporting elements 9, 10, 11 and the adjustment devices, locking devices and the power supply 57 can be designed in analogy with the first display device 1 according to this invention.

The holograms are computed in the encoding device 26, for example as described in document DE 10 2004 063 838 A1, from the three-dimensional representation to the section planes, transformation and addition of the partial wave fronts in the observer plane 4. A transformation of the aggregated wave front from the observer plane 4 to the plane of the light modulator 16, 17 is only necessary if the light modulator is situated outside the observer plane 4, and if the wave front is encoded as a hologram.

Figure 7:
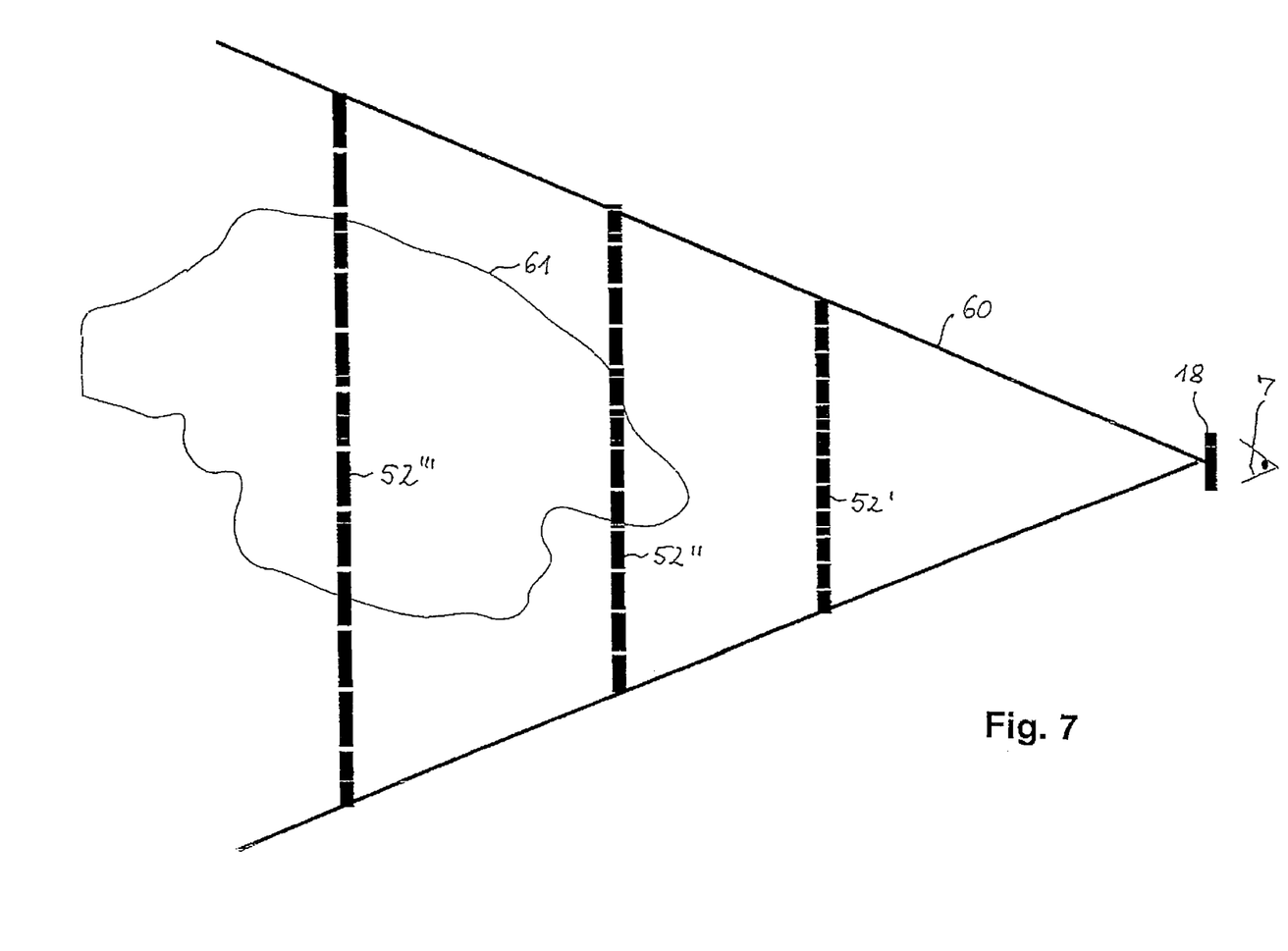
FIG. 7 shows a frustum stretching from the observer window during the visualisation of a three-dimensional object image with light modulators of different size and at different distances to the observer window.

An observer who looks through an observer window 18, 19, sees a reconstruction of the three-dimensional representation—a scene—as shown in FIG. 7, in a region defined by a frustum 60 whose apex angle depends on the pixel pitch of the light modulator.

Now, a numerical example will be given in order to compare the inventive device with the devices in the previous patent applications:

A direct-view display device is for example characterised by a display area of $430 \times 320$ mm$^2$, a pixel pitch of 207 µm—here full pixels for encoding one complex number each—and 2048 pixels per line. This arrangement produces an observer window with a width of about 6 mm at a distance of two metres.

If, in contrast, a small light modulator with a width of 6 mm and with the same number of 2048 pixels, i.e. with a pixel pitch of 3 µm, is situated in the observer window of the display device according to this invention, then a diffraction order with a width of 430 mm is created at a distance of two metres, if it is coherently illuminated. Consequently, the same frustum 60 stretches between the diffraction image and observer window. This means that the same visible reconstruction space is created as in the direct-view arrangement with the large screen area. The angle to the margin of the diffraction order is therein a few degrees.

If a pixelated light modulator is used for encoding, this will result in higher diffraction orders. If no additional measures for suppressing those higher diffraction orders are taken, repetitions of the entire frustum will appear next to the frustum at large angles in the form of higher diffraction orders. This means that a periodic continuation of the reconstruction will occur, which is, however, spatially separated from the desired reconstruction. A large, extended reconstructed scene is then perceived several times side by side, but the individual repetitions of the reconstruction do not overlap spatially, if the frequency range of the object to be represented is accordingly limited.

Figure 4:
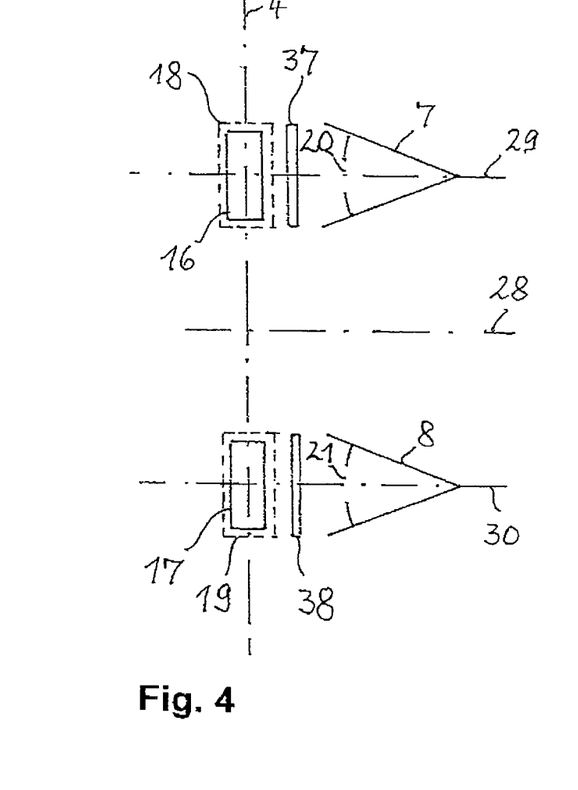
FIG. 4 shows schematically a light modulator arrangement in the optical part according to FIG. 1 with two light modulators which are disposed in the observer windows in the observer plane and immediately in front of the eye pupils, where an angle-selective element is disposed between each light modulator and eye pupil.

According to this invention, various measures serve to suppress higher diffraction orders:

In the part of the display device 1 shown in FIG. 4, an angle-sensitive element 37, 38, e.g. in the form of a foil, is disposed each between a light modulator 16, 17, which is disposed directly in the observer window 18, 19, and an eye 7, 8, said angle-sensitive element only letting pass light which is emitted by the light modulator 16, 17 at small angles, while light which is emitted at large angles cannot reach the eye 7, 8. The arrangement according to FIG. 4 has the advantage that it is very compact.

In the optical part shown in FIG. 5, the light modulator 41, 42 itself is disposed outside the observer window 18, 19, where the light modulator 41, 42 is transformed by the optical system 43, 44 into the observer window 18, 19. A filter unit—for example a 4-f system (not shown)—or an aperture stop 45, as shown in FIG. 5, is disposed between the light modulators 16, 17 and the observer windows 18, 19, in order to prevent cross-talking between the two eyes 7, 8 of the observer. The arrangement has a compact design and uses lenses with short focal lengths, so that the display device 40 can be mounted to a frame, i.e. to the helmet, or that it can be fixed on the head of the observer like goggles.

In a first embodiment of the second head-mounted display device 40 according to this invention, which is shown in FIG. 5, where the light modulator 41, 42 is disposed near the eye 7, 8 of the observer, but outside the observer plane 4, the light modulator 41, 42 can also be imaged into the observer window 18, 19 if the code is adapted accordingly.

Figure 6:
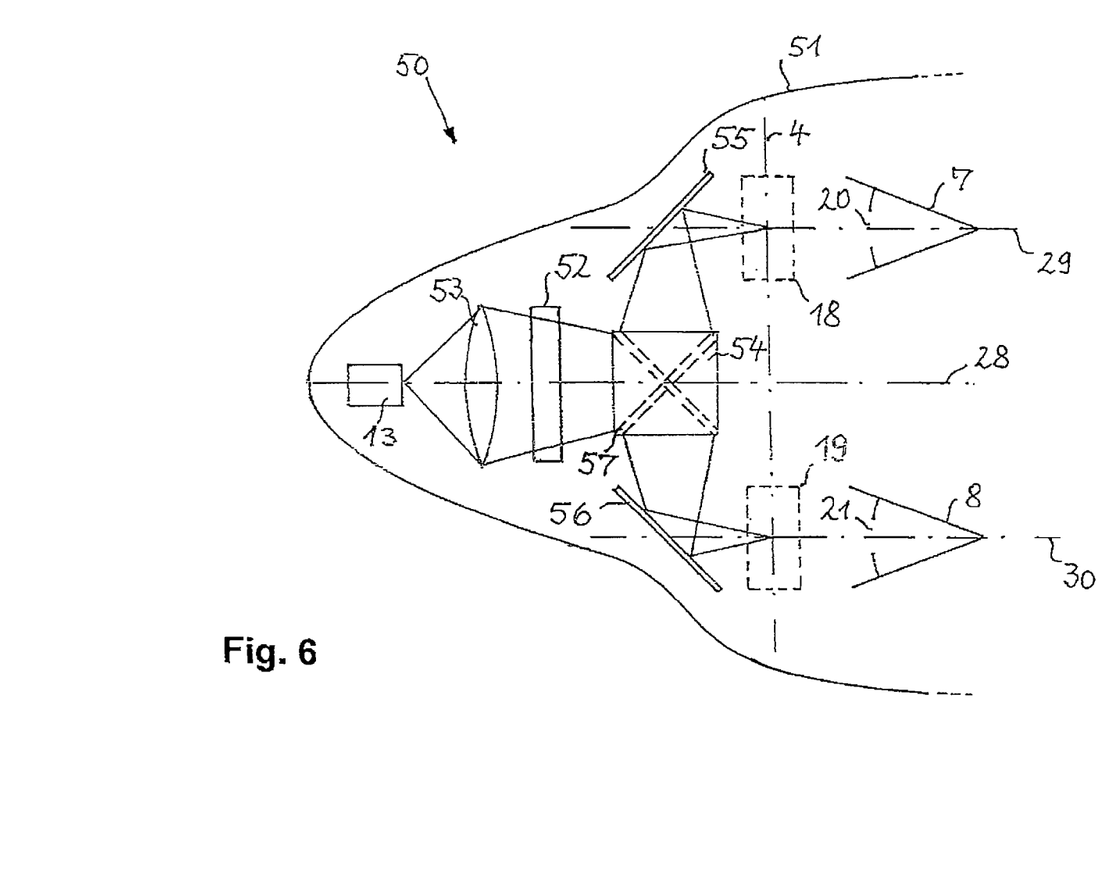
FIG. 6 shows schematically the front section with a light modulator outside the observer plane in the region near the observer windows with a light source according to the principle illustrated in FIG. 5 and a beam splitter for the alternate imaging of the light modulator into the observer windows.

FIG. 6 shows a second embodiment of the second head-mounted display device 50 according to this invention, where only one encodable light modulator 52 is used, which is disposed across the direction of the centre axis 28 of the display device. A light source 13 and an optical system 53 are disposed in front of the light modulator 52. A subsequently disposed beam splitter 54 and two reflectors, which are disposed at the sides of it and at a distance to each other and which are inclined in relation to the axes 29, 30 of the eye pupils, are disposed in front of the observer plane 4. The encoding surface of the light modulator 52 is transformed by the beam splitter 54 into the observer windows 18, 19. It is also possible to image the light modulator 52 into the observer windows 18, 19 with the help of a subsequent optical system (not shown). However, this display device will only work if a switching device 57 provides the wave fronts which correspond to the alternating codes on the light modulator 52 accordingly to the left and right eye 7, 8.

The switching device 57 can be designed in the form of a deflection device for bundles of rays, which is frequency-controlled by the encoding device 26, and it can be disposed either in the unsplit or in the split optical path.

Now, the scalability will be discussed with a view to the location of the light modulators.

Figure 8:
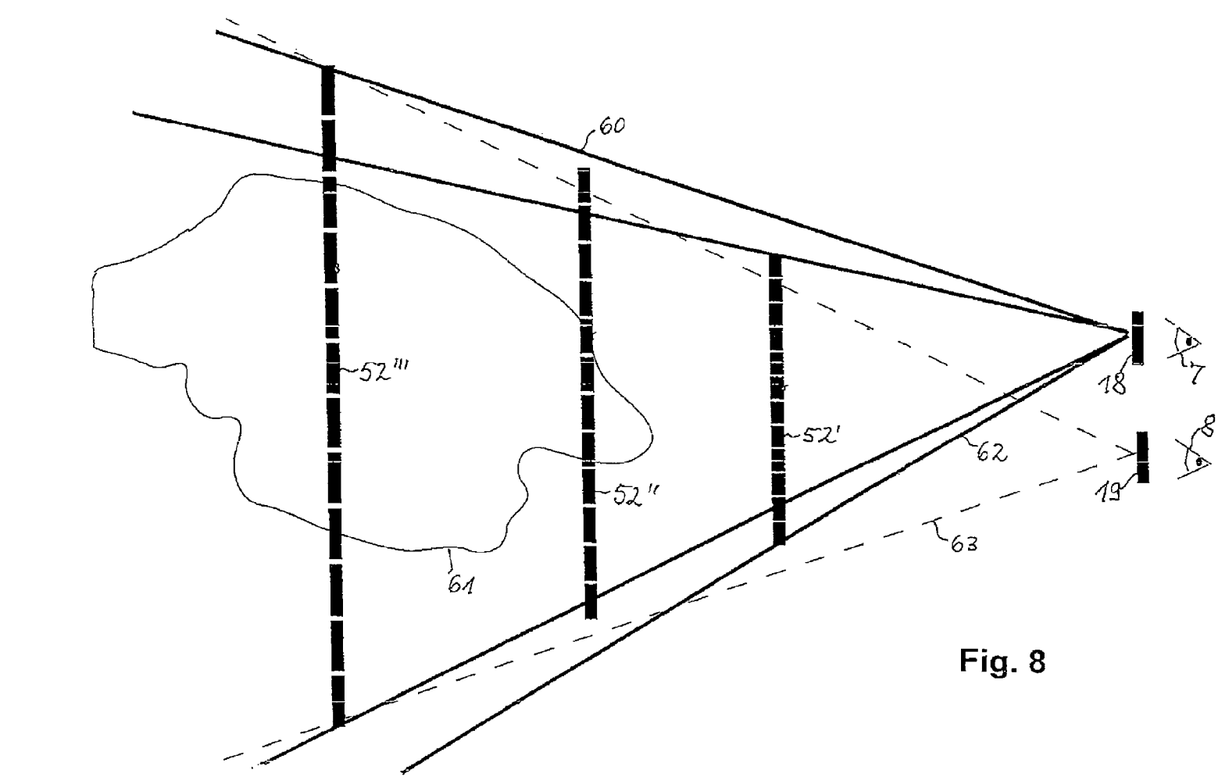
FIG. 8 shows two slightly different frustums for two eyes, said frustums deviating from the axes of the eye pupils, from two observer windows, for a common light modulator at different distances to the observer.
Figure 9:
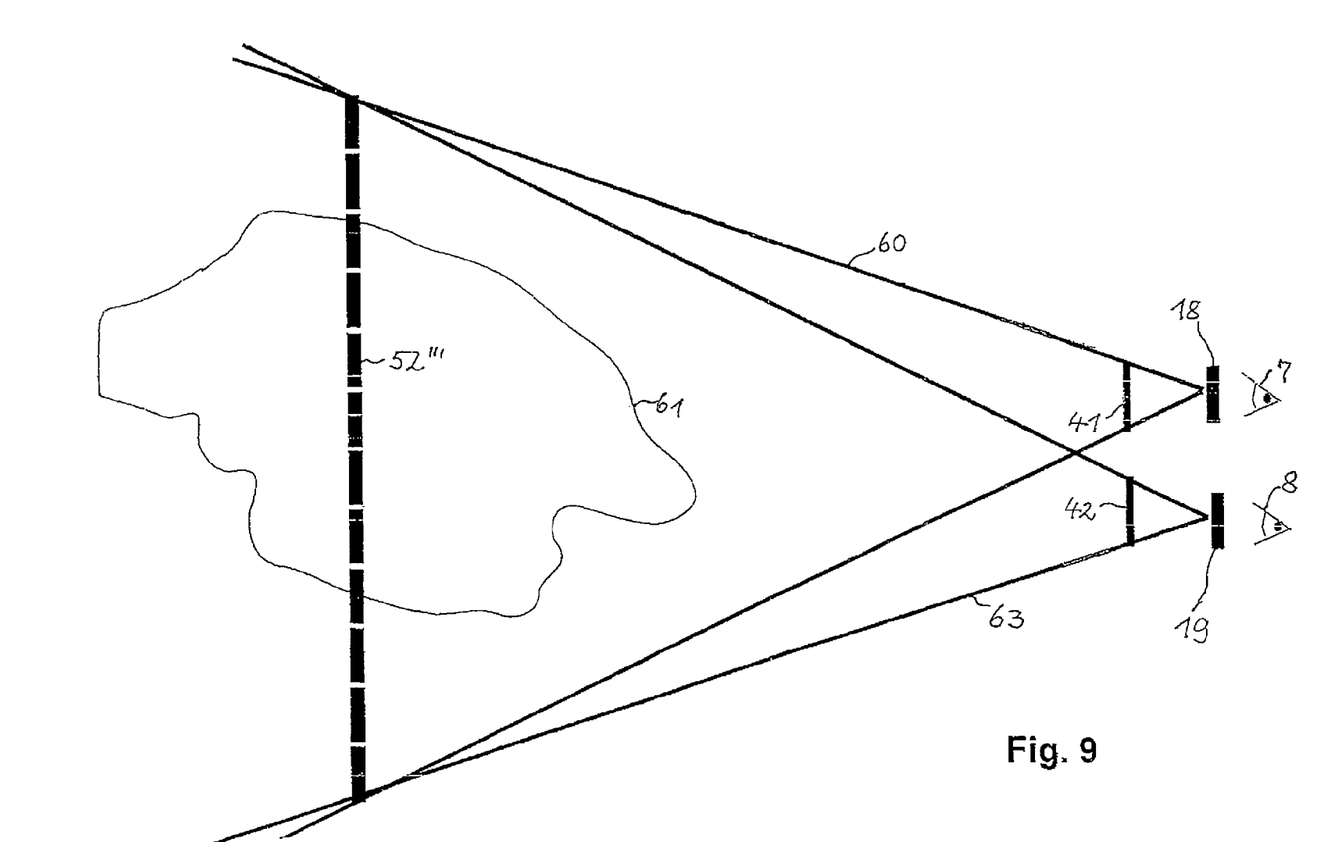
FIG. 9 shows frustums with a separate small light modulator each in the region close in front of each eye, where the same frustum is achieved for each eye with the same three-dimensional object image as with a single large light modulator at a large distance, as shown in FIG. 7 or FIG. 8.

Referring to FIGS. 7, 8 and 9, if the frustum stretches from the observer window towards a screen surface, and if it continues beyond the display, as described for example in the document DE 10 2004 063 838 A1, and if an observer window is disposed centrally in front of the display, identical frustums 60 will be created for a screen area of 20 inches and an observer distance of two metres, for a screen area of 10 inches and an observer distance of one metre, and for a screen area of 5 inches and an observer distance of half a metre, provided the light modulators have the same resolution, i.e. differ in their pixel size in proportion with their distance to the observer.

In the cases described above, the same three-dimensional representation can be encoded on a light modulator. The computation of the complex values of the wave front from the three-dimensional representation to the section planes and to the observer window is identical. The same complex values of the wave front are then provided in the observer window. The only difference is the computation of the transformation from the observer window to the light modulator—a different phase factor is used depending on the distance, and accordingly different complex values are encoded on the light modulator.

Alternatively, a direct computation for one of the cases and a subsequent transformation of the hologram from the one to the other screen area is possible, e.g. from the hologram computed for a 20-inch screen and a distance to the observer of two metres, to a 10-inch screen and a distance to the observer of one metre.

This description does not apply with high precision, if with a single light modulator two different observer windows are created for the left eye and for the right eye, both of which being displaced by half the eye separation to the left and to the right, respectively, in relation to the central position in front of the screen surface (cf. FIG. 8). If separate light modulators are used in front of each eye, as illustrated in FIG. 9, the same frustum is obtained for each eye as if a single light modulator was used.

The individual forms of the frustums are shown in the FIGS. 7, 8, 9.

FIG. 7 shows a frustum 60 from the observer window 18 during the visualisation of the reconstruction 61 of the three-dimensional representation with light modulators 52', 52'', 52''' of different size and at different distances to the observer window 18.

FIG. 8 shows the frustums 62, 63 which stretch from two observer windows 18, 19 for two eyes 7, 8, with the axes 29, 30 of the eye pupils, for common light modulators 52', 52'', 52''', which are disposed on the centre axis at different distances to the observer, for the visualisation of the reconstruction 61 of the three-dimensional representation.

FIG. 9 shows two separate small light modulators 41, 42, which are disposed in the region close in front of the respective eye 7, 8, where identical frustums 60, 63 are achieved for each eye 7, 8 with the same three-dimensional reconstruction 61 of the three-dimensional representation as with a single large light modulator 52''' at a large distance, as shown in FIG. 7 or FIG. 8.

The arrangement can be realised using small light modulators—e.g. LCoS, where small light modulators 31, 32; 33, 34; 41, 42; 52 are disposed at a small distance to the observer plane 4.

This differs from the above-described option illustrated in FIGS. 1 to 4, where the light modulator 16, 17 is disposed in the observer plane 4 or is imaged into the observer plane 4. Referring to FIG. 9, the encoding surface of the light modulator lies near the observer, but outside the observer plane 4. In this arrangement, multiple diffraction orders will occur side by side in the observer plane 4. If the observer window 18, 19 is larger than the eye pupil 20, 21, the observer will not see any periodic continuations.

The size of the observer window 18, 19 is preferably adapted to the size of the range of movement of the eye pupil 20, 21 within the eye 7, 8, so that the observer remains in the observer window 18, 19 if his pupils move.

If there is a small distance between the screen surface and the observer window 18, 19, separate light modulators can be used again for the left and right eye, where there are two frustums 60, 63 with the respective eye 7, 8 in the centre.

Higher diffraction orders only have to be suppressed if a higher diffraction order of the observer window 18 of the left eye 7 reaches the right eye 8 or vice versa.

In this respect, FIG. 5 shows the simple optical arrangement of the second display device 40 according to this invention, comprising a light source 13, 14 for each light modulator 41, 42, an optical system in the form of an optical illumination system 43, 44, a light modulator 41, 42 for each eye 7, 8, and an element or component 45 which serves as a barrier, which blocks light of higher diffraction orders between the two eyes 7, 8. The barrier 45 prevents the eyes 7, 8 from perceiving higher diffraction orders of the respective other light modulator 42, 41. One possible realisation of such barrier 45 is an aperture stop.

If the design is sufficiently compact, such a display device 40 can also be mounted firmly to the helmet frame 2 or goggle frame fixed to the head of the observer.

The invention also makes it possible to realise a relatively simple optical arrangement of a head-mounted display device. Further, in comparison with a large direct-view arrangement, no array of light sources and no large lens or lens array is required for illumination, but only a single light source, or one per colour, for each eye and lenses of the size of the light modulator, i.e. typically with a diameter of between 0.5 inches and 2 inches. These can be manufactured easily.

Two-dimensional encoding methods can be employed without difficulty, where one light modulator with full resolution can be provided for each eye without the need of providing for stereo separation, as would be necessary with direct-view devices, and without the need of providing for time multiplexing of left and right holograms.

Further, complicated and costly components for tracking the observer window to a changing observer position are not required.

It is not necessary to change the position of the light source relative to the light modulator, because both move together with the head, because they are fixed to the helmet or goggle frame. As a consequence, a shutter display or comparable means, as provided in the direct- view arrangement for tracking, becomes superfluous. This has the effect that there is more brightness, so that for example no optical imaging system and no large screen area are required.

If the display devices 1, 40, 50 are mounted to the frame 2 or 51, which is intended for a human head, the display devices 1, 40, 50 can preferably be adjusted at least once relative to the eye 7, 8 at the beginning of the visualisation. This ensures that the eye 7, 8 always remains within the observer window 18, 19, even if the head is moved later, because the observer window 18, 19 is moved the same way. An additional device for detecting the observer position thus becomes superfluous. There can thus be no disturbances caused by imprecise observer tracking.

LIST OF REFERENCE NUMERALS

1 First display device
2 Frame
3 Front section
4 Observer plane
5 Left side section
6 Right side section
7 Right eye
8 Left eye
9 First supporting element
10 Second supporting element
11 Third supporting element
12 First optical system
13 First light source
14 Second light source
15 Second optical system
16 First light modulator
17 Second light modulator
18 First observer window
19 Second observer window
20 Right eye pupil
21 Left eye pupil
22 First adjustment device
23 Second adjustment device
24 First locking device
25 Second locking device
26 Encoding device
27 Power supply
28 Centre axis of the display device
29 First axis of an eye pupil
30 Second axis of an eye pupil
31 Amplitude-modulating light modulator
32 Amplitude-modulating light modulator
33 Phase-modulating light modulator
34 Phase-modulating light modulator
35 Encoding surface
35' Modulator image
36 Encoding surface
36' Modulator image
37 Angle-selective element
38 Angle-selective element
40 Second display device (first embodiment)
41 Light modulator
42 Light modulator
43 Third optical system
44 Fourth optical system
45 Aperture stop
46 Fifth optical system
47 Sixth optical system
50 Second display device (second embodiment)
51 Second frame
52' Light modulator
52" Light modulator
52''' Light modulator
53 Seventh optical system
54 Beam splitter
55 First reflector
56 Second reflector
57 Switching device
58 First optical illumination system
59 Second optical illumination system
60 First frustum
61 Reconstruction of a three-dimensional representation
62 Second frustum
63 Third frustum
64 Sensor
65 Audio signal device

The invention claimed is:

1. Head-mounted display device for generating reconstructions of three-dimensional representations, comprising a frame which resembles a helmet or goggles with at least a front section and two side sections disposed at a distance, where the front section is located in front of eyes and is related to the positions of the eyes, and has a design where there are at least one light source, at least one optical system and at least one light modulator which can be encoded, where the light modulator with a code of a wave front of the three-dimensional representation in the encoding surface is located at the position of a defined observer window in an observer plane or where the light modulator with a code of a hologram of a wave front of the three-dimensional representation in the encoding surface is located in a region close in front of the observer window, seen in the direction of the light propagation, for a transformation of the hologram into the observer window such that its size corresponds at least with a part of the range of movement of an eye pupil of an eye, and where the at least one light modulator is connected to an encoding device in which wave fronts or holograms thereof are computed from the three-dimensional representations for the encoding surfaces, with which the at least one light modulator can be encoded directly, so that if the light modulator is illuminated there are complex wave fronts of the three-dimensional representations in the observer window, and when the light modulator is located in a region close in front of the observer window, the observer window is located in a plane of the light source and the reconstruction of the three-dimensional representation becomes visible in a reconstruction frustum, which stretches between the observer window and the light modulator.

2. Display device according to claim 1, wherein the encoding surface of the light modulator which is disposed in the observer windows in the observer plane can be encoded with complex values comprising amplitude and phase, or with values derived from those quantities, provided by the encoding device.

3. Display device according to claim 1, wherein for encoding complex values of the wave fronts in the observer window, a combination of amplitude-modulating light modulators or phase-modulating light modulators or a combination of amplitude- and phase modulating light modulator is provided, which are connected by a beam splitter or by an imaging of one light modulator on to the respective other light modulator.

4. Display device according to claim 3, wherein if a combination of an amplitude- and phase modulating light modulator is provided, the amplitude-modulating light modulator is on the one hand disposed in the region near the observer windows, but outside the observer plane, and that the phase-modulating light modulator is disposed directly in the observer plane, where the encoding surface of the amplitude-modulating light modulator can be imaged on to the phase-modulating light modulator as a modulator image with the help of an optical imaging system, or that, on the other hand, the amplitude-modulating light modulator and the phase-modulating light modulator are disposed the other way round.

5. Display device according to claim 1, wherein the encoding surface of the light modulator is defined such that its size corresponds with the entire range of movement of the eye pupil within the eye or wherein the encoding surfaces of the light modulators have the same size as the surface areas of the eye pupils.

6. Display device according to claim 1, wherein one encodable light modulator is used in an optical part, said light modulator being disposed across the direction of a centre axis of the display device, and where a light source and an optical system are disposed in front of that light modulator, where a subsequently disposed beam splitter and two reflectors, which are disposed at the sides of the beam splitter and at a distance to each other and which are inclined in relation to the axes of the eye pupils, are disposed in front of the observer plane, and where the encoding surface of the light modulator is illuminated and transformed into the two observer windows with the help of the optical system and the beam splitter, where a switching device is disposed in the unsplit optical path, said switching device switching the information which alternates on the entire encoding surface of the light modulator alternately to the left and right observer windows at a given frequency.

7. Display device according to claim 6, wherein the switching device is designed in the form of a deflection device for bundles of rays, which is frequency-controlled by the encoding device.

8. Display device according to claim 1, wherein in the optical path with at least one light source, at least one light modulator, an illuminating optical system, and with the respective generated wave fronts in the observer windows, there is at least one element or component which serves as an aperture stop, which blocks disturbing diffracted light between the two eyes.

9. Display device according to claim 1, wherein at least one angle-sensitive element in the form of a passive or active optical element is disposed between a light modulator and an eye, said element only letting light pass which is emitted by the light modulator at small angles, where the light modulator is disposed directly in the observer window.

10. Display device according to claim 1, wherein where two light modulators are used, a filter unit or an aperture stop is disposed in the optical part between the one light modulator and the one observer window on the one hand, and the other light modulator and the other observer window on the other hand, where a compact design is provided with lenses which exhibit a short focal length.

11. Display device according to claim 1, wherein the encoding device comprises at least a computer and memory and programming means for carrying out the computations of the information for encoding the encoding surface(s) of the light modulator.

12. Display device according to claim 1, wherein the light modulator is connected with at least one light source, which directs sufficiently coherent light at the light modulators.

13. Display device according to claim 1, wherein where colour reconstructions are desired, the light sources comprise three sub-light sources which emit a green, red and blue spectrum, respectively, which are combined by way of time multiplexing.

14. Display device according to claim 1, wherein the frame comprises at least one supporting element and wherein both transparent and reflective optical parts are employed in the front section, where the optical parts are mounted firmly to the frame with mechanical means and the supporting elements.

15. Display device according to claim 14, wherein an adjustment device is disposed between a light modulator and at least one supporting element of the frame, and a locking device is disposed between a light modulator and the corresponding light source, where the light modulator and the corresponding optical part with light source and optical system are adjustable and lockable with the help of the adjustment device and the locking device in relation to the observer plane and the centre axis of the display device and the axes of the eye pupils, which are parallel to the latter, or where the light modulator and the corresponding optical part with light source and optical system are adjustable and lockable with the help of the adjustment device and the locking device in relation to the observer plane or the centre axis of the display device and the axes of the eye pupils, which are parallel to the latter.

16. Display device according to claim 15, wherein there are mechanical connections between the adjustment devices and the locking devices on the one hand and the optical part and the supporting elements on the other hand, and that the light sources and the light modulators are connected with the encoding device and a power supply through electric connection cables.

17. Display device according to claim 1, wherein the frame is a helmet, goggles, or a supporting arrangement fitted with a minimum number of parts at least for the optical part, where the display device optionally has the form of goggles or is supported by a helmet in a firmly standing form, or is firmly connected in a mobile form with the helmet and the head of the observer or is firmly connected in a mobile form with the helmet or the head of the observer.

18. Display device according to claim 1, wherein in the region of the frame, at least one sensor is disposed which sends signals to the encoding device according to the change in the viewing angle of the observer when he moves his head, so that the information for encoding the light modulator is modified.

19. Display device according to claim 1, wherein the frame is combined with at least one audio signal device, and the output of audio signals is switched in synchronism with the encoding of the wave fronts in the light modulators.

20. Display device according to claim 1,
wherein depending on the size of the observer window, at least one element for suppressing cross-talking of deflected light among the two eyes can be used in the vicinity of the observer plane.

* * * * *